United States Patent
Tartufoli (12)

(10) Patent No.: US 6,539,980 B2
(45) Date of Patent: Apr. 1, 2003

(54) ACRYLATE-FILLED FLEXIBLE TUBE, WHICH OPENS ON CONTACT WITH WATER

(75) Inventor: Carlo Tartufoli, Civitella Del Tronto (IT)

(73) Assignee: Tarfil S.r.l., Civitella Del Tronto (IT)

( * ) Notice: Subject to any disclaimer, the term of this patent is extended or adjusted under 35 U.S.C. 154(b) by 0 days.

(21) Appl. No.: 10/174,048

(22) Filed: Jun. 18, 2002

(65) Prior Publication Data

US 2002/0189700 A1 Dec. 19, 2002

(30) Foreign Application Priority Data

Jun. 18, 2001 (IT) .......................................... MIA001279

(51) Int. Cl.⁷ ............................................... F16L 11/00
(52) U.S. Cl. ........................ 138/137; 132/123; 132/89; 132/103
(58) Field of Search .................... 138/137, 140, 138/123, 124, 89, 103, 177; 604/367, 364; 174/113 C, 118

(56) References Cited

U.S. PATENT DOCUMENTS

| 4,659,589 A | * | 4/1987 | Jimenez .................... 427/140 |
| 4,749,730 A | * | 6/1988 | Jimenez .................... 524/27 |
| 4,806,408 A | * | 2/1989 | Pierre et al. ................ 428/138 |
| 4,820,560 A | * | 4/1989 | Buchwald et al. ......... 174/23 C |
| 5,070,597 A | * | 12/1991 | Holt et al. .................. 138/103 |
| 5,246,770 A | * | 9/1993 | Bottiglione et al. ........ 156/276 |
| 5,763,067 A | * | 6/1998 | Bruggemann et al. ... 428/305.5 |
| 6,033,769 A | * | 3/2000 | Brueggemann et al. ..... 138/141 |
| 6,326,551 B1 | * | 12/2001 | Adams .................... 174/113 C |

* cited by examiner

*Primary Examiner*—Patrick Brinson
(74) *Attorney, Agent, or Firm*—Steinberg & Raskin, P.C.

(57) ABSTRACT

The flexible tube is filled with a substance which expands on contact with water. The tube is wholly or partly of a material which loses consistency on contact with water, enabling the substance to expand. The filled tube is insertable into an energy transportation or telecommunications cable.

11 Claims, No Drawings

ACRYLATE-FILLED FLEXIBLE TUBE, WHICH OPENS ON CONTACT WITH WATER

FIELD OF THE INVENTION

The present invention relates to a flexible tube filled with a substance which expands on contact with water, the tube being wholly or partly of a material which loses consistency on contact with water, enabling said substance to expand.

BACKGROUND OF THE INVENTION

As is known to the expert of the art, if for any reason water enters energy transportation or telecommunications cables (whether electricity conductor cables or fibre optic cables), the cable undergoes damage. The damage is greater the longer the cable portion into which the water has penetrated. This drawback is particularly damaging for fibre optic cables. Any water which accidentally enters the outer cable sheath must therefore be prevented from flowing along it and aggravating the damage. To achieve this result, powdered or granular acrylate is disposed between the conductive wires or optical fibres during cable manufacture (so that it lies on the inside of the sheath). This material has the property of swelling considerably on contact with water to create a "plug" which blocks water passage. The acrylate hence performs that function known to cable manufacturers as water blocking, the acrylate powder being known as WB powder.

However acrylate is known in this sector to be an extremely dangerous material, which must be handled with maximum care by cable manufacturing operators. In this respect, if inhaled, the bronchial tubes swell and become blocked.

The machines currently used by cable manufacturers to construct cables are machines which have been designed taking account of all the complex operations involved in cable manufacture, however the WB powder problem has been ignored, this being a problem which has arisen only recently. The solution could be to enclose such a machine in an air-tight container with a suction and powder removal system, however this would involve problems including high cost.

Cable manufacturers are therefore particularly interested in anything which can reduce the risks or simplify safety procedures accompanying the manufacture of such cables.

OBJECTS AND SUMMARY OF THE INVENTION

An object of the present invention is therefore to find a simple and economical solution to the aforestated problem.

The said object is attained by a flexible tube filled with a substance which expands on contact with water, the tube being wholly or partly formed of a material which loses consistency on contact with water, enabling said substance to expand.

DETAILED DESCRIPTION OF THE INVENTION

According to one embodiment of the invention, the tube is formed from a fabric and the expandable substance is in the form of powder and/or granules, the fabric being sufficiently compact to prevent passage of the powder or granules through it.

To cause the fabric tube to open, it can be formed wholly or partly of threads of a material which loses consistency on contact with water. According to a particularly simple embodiment, the fabric tube is formed from a strip of fabric folded into a tube, the two longitudinal edges of the strip being sewn together, to obtain the tube, by a thread of a material which loses consistency on contact with water; or the two edges of the strip being glued together with a glue which loses consistency on contact with water.

According to another embodiment, the fabric tube is formed from a strip of fabric formed wholly or partly of threads of said material which on contact with water loses consistency, the two longitudinal edges of the strip being sewn together by a thread of said material or even by any thread. According to a further embodiment, the fabric tube consists of a tubular braid formed wholly or partly of threads of a material which loses consistency on contact with water.

A material of this type which can be conveniently used is polyvinylalcohol, obtainable commercially under the brand name of Kuralon KII (registered trademark), which is a water-soluble material. The material may also be an alginate.

The flexible tube, filled with expandable substance, is fed to the conventional cable manufacturing machines together with the conductive wires or optical fibres, the tube being on the inside of the external sheath within the formed cable.

To fully appreciate the present invention, it should be noted that a machine for forming the flexible tube filled with said expanding substance is in any event a small machine, which can easily be enclosed within a sealed container. Even when provided with the relative suction and powder removal system, such a container is of small dimensions if compared with that which would have to be provided to enclose a cable manufacturing machine.

What is claimed is:

1. A flexible tube filled with a substance which expands on contact with water, said tube comprising:
   a tube body which is formed of a strip of fabric folded into a tube, two longitudinal edges of the tube being sewn together, to obtain the tube, by a thread of a material which loses consistency on contact with water;
   wherein said expandable substance is in the form of a powder and/or granules and the fabric is sufficiently compact to prevent the powder or granules from passing through said fabric.

2. A flexible tube filled with a substance which expands on contact with water, said tube comprising:
   a tube body which is formed of a strip of fabric folded into a tube, two longitudinal edges of the tube being held together, to obtain the tube, by a glue that loses consistency on contact with water;
   wherein said expandable substance is in the form of a powder and/or granules and the fabric is sufficiently compact to prevent the powder or granules from passing through said fabric.

3. A flexible tube filled with a substance which expands on contact with water, said tube comprising:
   a tube body which is formed of a stip of fabric formed at least partially of threads of a material that loses consistency on contact with water, two longitudinal edges of the tube being held together to form a tube,
   wherein said expandable substance is in the form of a powder and/or granules and the fabric is sufficiently compact to prevent the powder or granules from passing through said fabric.

4. The flexible tube according to claim 1, wherein said material which loses consistency on contact with water is alginate.

5. The flexible tube according to claim 3, wherein said material which loses consistency on contact with water is alginate.

6. The flexible tube according to claim 1, wherein said tube is insertable into an energy transportation or telecommunications cable.

7. The flexible tube according to claim 2, wherein said tube is insertable into an energy transportation or teleconmnunications cable.

8. The flexible tube according to claim 3, wherein said tube is insertable into an energy transportation or telecommunications cable.

9. The flexible tube according to claim 1, wherein said expandable substance is a acrylate.

10. The flexible tube according to claim 2, wherein said expandable substance is a acrylate.

11. The flexible tube according to claim 3, wherein said expandable substance is a acrylate.

* * * * *

UNITED STATES PATENT AND TRADEMARK OFFICE
CERTIFICATE OF CORRECTION

PATENT NO.    : 6,539,980 B2
DATED         : April 1, 2003
INVENTOR(S)   : Carlo Tartufoli It is certified that error appears in the above-identified patent and that said Letters Patent is hereby corrected as shown below:

<u>Title page,</u>
Item [30], Foreign Application Priority Data, Foreign Application No. should read
-- MI2001 A 001279 --

Signed and Sealed this

Twelfth Day of August, 2003

JAMES E. ROGAN
*Director of the United States Patent and Trademark Office*